Figure 1:
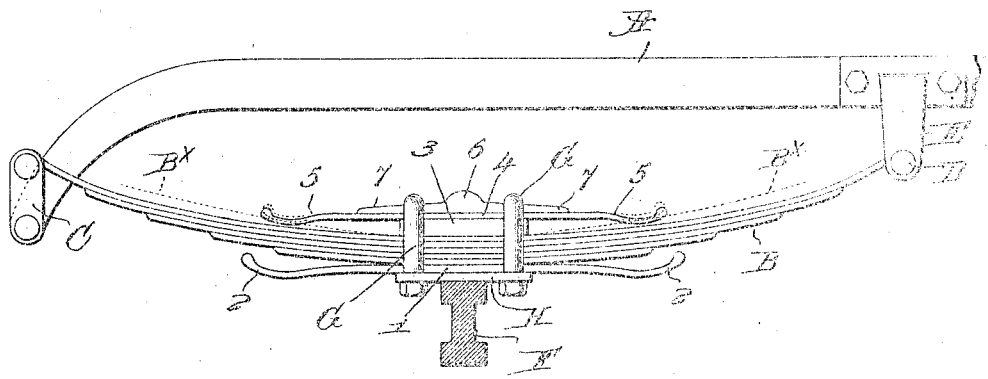

O. B. AMES.
SHOCK ABSORBER.
APPLICATION FILED NOV. 30, 1911.

1,029,252.

Patented June 11, 1912.

UNITED STATES PATENT OFFICE.

OWEN B. AMES, OF BREWSTER, NEW YORK.

SHOCK-ABSORBER.

1,029,252.　　　　　Specification of Letters Patent.　　Patented June 11, 1912.

Application filed November 20, 1911. Serial No. 661,302.

*To all whom it may concern:*

Be it known that I, OWEN B. AMES, a citizen of the United States, and a resident of Brewster, county of Putnam, State of New York, have invented an Improvement in Shock-Absorbers, of which the following description, in connection with the accompanying drawing, is a specification, like characters on the drawing representing like parts.

This invention has for its object the production of a novel, simple and durable shock-absorber for use on automobile and similar vehicles, to prevent violent rebound or upward snap of the springs on the recoil after flexure. The spring action in such a vehicle varies greatly according to the character of the road-bed traversed, and an efficient shock-absorber must possess a certain flexibility of operation to adapt it to the road conditions. If the roadway is smooth the vehicle spring should be free from restrain when flexed, so that its action may be complete and easy, the body of the vehicle rising and falling softly and comfortably, without shock or jar as small inequalities are encountered by the wheels. A properly flexible spring for smooth roads is, however, too flexible on rough roads, for after compression the recoil is quick and sharp, and gives rise to the upward snap or jump which makes riding on a rough road so uncomfortable.

My novel shock-absorber is so constructed and arranged that it adapts itself automatically to road conditions, assumes control of the vehicle spring only when called into action by recoil movement of the latter due to light or heavy jars, that is, it is normally in a passive condition, and does not in any way interfere with the riding of the car. After the shock absorber is once applied it needs no adjustment, is practically indestructible, and obviates spring breakage under all ordinary circumstances. It is equally adapted for light or heavy springs, performing its designed functions properly and completely in either case.

The various novel features of my invention will be fully described in the subjoined specification and particularly pointed out in the following claims.

Figure 2:
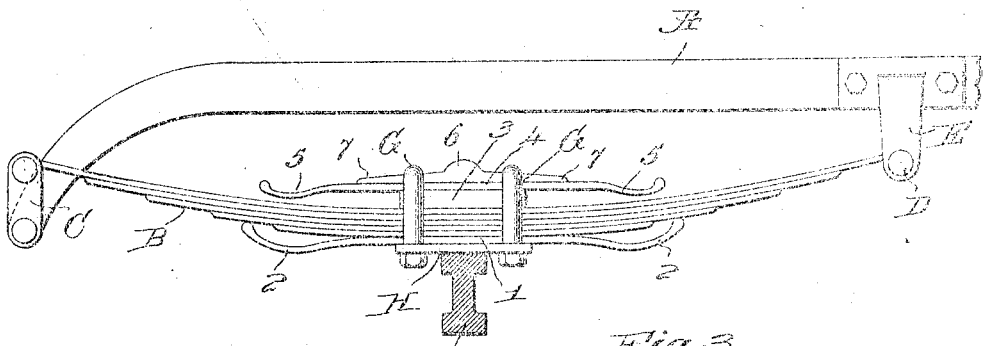
Figure 2:
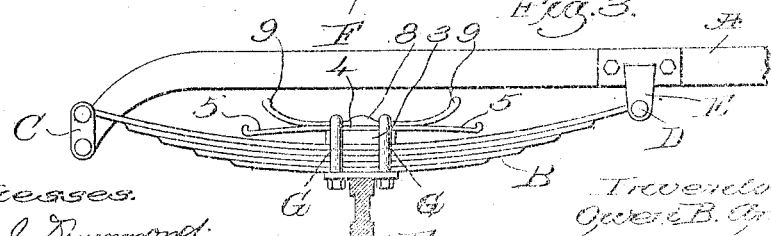

Figure 1 is a side elevation of a well known form of vehicle spring and a portion of the frame with which it is connected, with the axle shown in cross-section, one embodiment of my present invention being illustrated in connection with the spring, which latter is supposed to be in normal or substantially unflexed condition; Fig. 2 is a similar view, but showing the spring flexed sufficiently to bring into action the novel form of reinforcing bumper forming a part of my invention; Fig. 3 is a view similar to Fig. 1, but on a smaller scale, showing a modification, to be referred to.

Referring to the drawing, A is a portion of the frame of a vehicle, such as an automobile, and B is a common form of leaf-spring used on such vehicles, connected at one of its ends by the swinging link C with the frame, and at its other end pivotally connected at D with a hanger E fixedly attached to and depending from the frame. The spring is secured to the axle F in any usual manner, as by the clips G, but in accordance with my present invention the clips are made somewhat longer than is customary, for a purpose to be described.

Beneath the spring B, and between it and the clip-plate H I interpose a reinforcing bumper, made as a bar 1 of spring-steel and having its opposite ends bent or curved, as at 2, 2, beneath and turned toward the lower or convex face of the spring, but normally out of engagement therewith, as shown in Fig. 1. The middle portion of the bumper is rigidly clamped and securely held in place between the clip-plate H and the central portion of the spring, while the free and resilient ends of the bumper lie in the path of movement of the spring when flexed abnormally, as shown in Fig. 2. At such time the downward thrust of the spring is taken up by the bumper, its free ends by their resilience serving not only to take up any shock due to a sudden or abnormal flexure of the spring but also acting to reinforce the resistance of the spring to flexure. Thus a light spring can be used, sufficient to accommodate ordinary road conditions, and when ruts, holes or other material irregularities are encountered the bumper will be brought into action, reinforcing or helping out the work of the spring. Ordinarily the bumper will not interfere with the spring action to any greater extent than does the rubber block frequently mounted on top of a spring at its central portion above the axle, but such block has no function of reinforcing the spring nor of taking up shock directly through its coöperation with the spring, as is the case with my novel bumper.

Above the spring B and held in place by the clips I interpose a spacing member 3, which may be a plate or block of wood, metal, or other suitable material, and upon said spacing member I seat my improved shock-absorber. This shock-absorber is herein shown as an elongated bar 4 of spring-steel of any suitable character, extended through the clips and having its opposite free ends 5, 5 slightly bent downward and lying in the recoil path of the spring B, but normally it is passive, exerting no effect upon the spring, as shown by full lines, Fig. 1, as the ends 5—5, do not engage the spring under normal conditions. A stiffening or strengthening bar 6 lies upon the bar 4, and is preferably made of similar resilient material, the free ends 7, 7 extending beyond the clips and lying snugly upon the extensions 5, Figs. 1 and 2. The parts 4 and 6 superposed one upon another, form a leaf-like shock-absorbing member, the spacing block 3 being made of such thickness as will hold the free ends 5, 5 of the shock-absorbing member just free of the spring B when unflexed. When the spring is flexed it tends to assume a straight line between its points of attachment with the frame A, the extent of flexure varying according to the character of the road, but ordinarily the spring will move without bringing the shock-absorber into action. If, however, a sudden jolt or jar causes an unusual or extreme flexure of the spring its recoil movement is also extreme and abnormal, tending not only to break the spring but to shake and severely jolt the vehicle body by the upward snap of the spring. By the use of my improved shock-absorber, however, this sudden recoil movement or snap of the spring is taken up and absorbed, for as the spring recoils it is brought into engagement with the free ends 5 of the shock absorber and the force of the impact tends to swing such ends upward and along the surface of said spring as indicated by dotted lines, Fig. 1, the concave surface of the spring at such time tending to assume the position B$^x$ indicated by the dotted line, and the resistance presented by the shock-absorber takes up the shock and absorbs it and prevents the very disagreeable and objectionable slatting or snapping of the spring on the recoil. It will thus be seen that a movable point of contact is provided which tends to spread or extend the force of the impact over or along the surface of the spring, thereby avoiding any fixed point of contact between the ends 5 of the member 4 with the spring and hence overcoming liability to break or snap the spring.

It will be noted that the shock-absorber is normally passive and does not in any way interfere with the ordinary action of the spring, and hence will not affect the easy riding of the vehicle under ordinary circumstances where no shock-absorber of any kind is necessary, but when abnormal conditions prevail and the more or less violent recoil of the spring takes place the shock which otherwise would be transmitted to the body of the car by such recoil is taken up, absorbed and dissipated by the shock-absorber. The upper portion of said shock-absorbing member stiffens and strengthens the lower or spring engaging portion, coöperating therewith between the free ends thereof and its fixed center.

After my improved shock-absorber has once been fitted and applied to a given spring no further adjustment is necessary at any time for the spacing block or plate 3 holds the central portions of the spring and the shock-absorbing member properly spaced apart, each to perform its own functions at the proper time, and when called upon to do so. The construction is extremely simple, it is strong and durable, being practically indestructible, unless the vehicle itself be smashed, and depends in no way upon hydraulic or pneumatic action or a combination thereof. The simplicity of the device is such that there is nothing to get out of order or out of adjustment as will be manifest. Not only is the uncontrolled recoil or rebound of the vehicle spring disagreeable in its effects upon the occupants of a vehicle, but it tends to break the spring and this tendency to spring breakage is effectually overcome by my present invention.

In Figs. 1 and 2 the stiffening and strengthening member or bar 6 is arranged so that its function is to reinforce the recoil resistance of the shock-absorbing member 4, 5, said member 6 not acting until the upward thrust of the ends 5 of the shock-absorbing member are brought into play by the recoil of the spring. The resistance of the spring to downward thrust is reinforced by the action of the bumper member 2, in Figs. 1 and 2, such bumper member only acting when the spring is flexed by the down thrust.

In Fig. 3 I have shown a modified construction whereby a single member can perform the bumper function as well as the function of reinforcing the shock-absorbing member against spring recoil. To this end I mount above the member 4, 5 a resilient member 8, fixedly held in place by the clips G, the opposite free ends of said member 8 being upturned at 9 toward and beneath the overhanging part of the frame A. When the spring B recoils after flexure the free ends 5 of the shock-absorbing member 4, 5 act to stiffen and strengthen said member and to reinforce the recoil resistance thereof, just as does the member 6, 7 in Figs. 1 and 2. When a sudden down thrust occurs, however, flexing the spring B, the upturned ends 9 of the member 8 are brought into engagement with the overhanging part A of the frame, flexing said member 8 so that it acts as a spring bumper, taking up a portion of the thrust. In Figs. 1 and 2 the bumper member 1, 2 takes up a portion of the downthrust, but by acting against the flexed spring B. Thus, by the modification shown in Fig. 3 the member 8, 9 has the twofold function of a stiffener and strengthener for the spring against recoil, and also as a spring bumper to take up a portion of the down thrust.

The construction and arrangement of the shock-absorbing member enables it to perform a very important additional function, that of preventing or stopping vibration of the main spring, precisely in the way that any body in vibration is damped by contact with another body. In actual practice I have found that vibrations of the spring are stopped instantly by contact with the normally passive shock-absorbing member, which is a very important feature, for vibration causes very objectionable crystallization of the metal of the spring, and is a prolific cause of spring breakage. This stoppage of vibration in the spring cannot be effected by any device in constant contact therewith, for such device must necessarily partake of the same vibrations, and hence the intermittent touching or engagement of the free ends of my shock-absorbing member with the vibrating portions of the spring can and does stop such vibrations.

Various changes in details of construction and arrangement may be made by those skilled in the art without departing from the spirit and scope of my invention as set forth in the claims annexed hereto.

Having fully described my invention, what I claim as new and desire to secure by Letters Patent is:

1. The combination with the frame member and the axle member of a vehicle, and a spring fixedly mounted on one of said members and operatively connected with the other member, of a resilient and normally passive member fixedly supported by the axle adjacent said spring and having its free ends oppositely extended adjacent and in the recoil path of the spring and extending toward said spring at opposite sides of the fixedly mounted portion of the spring, recoil of the spring after flexure bringing it into direct and temporary engagement with the free ends of and thereby flexing said resilient member to take up and absorb the shock of the recoil.

2. The combination with the frame member, and the axle member of a vehicle, and a spring fixedly mounted on one of said members and operatively connected with the other member, of a resilient and normally passive member supported above said spring, and a rigid spacing block interposed between said spring and said resilient member, the thickness of the block varying according to the curvature of the spring, to properly space the spring and said resilient member, said resilient member having its free ends oppositely extended adjacent to and in the recoil path of the spring and extending toward said spring at opposite sides of the fixedly mounted portion of the spring, recoil of the spring after flexure bringing it into direct and temporary engagement with the free ends of and thereby flexing said resilient member to take up and absorb the shock of the recoil.

In testimony whereof, I have signed my name to this specification, in the presence of two subscribing witnesses.

OWEN B. AMES.

Witnesses:
ALBRO TRAVIS,
B. BIRDSALL.